US009226364B2

(12) United States Patent
Fukasawa et al.

(10) Patent No.: US 9,226,364 B2
(45) Date of Patent: Dec. 29, 2015

(54) LED LIGHTING CIRCUIT, LED ILLUMINATION DEVICE, AND LED ILLUMINATION UNIT SOCKET

(75) Inventors: Hisashi Fukasawa, Yamanashi (JP); Takashi Akiyama, Saitama (JP)

(73) Assignees: CITIZEN HOLDINGS CO., LTD., Tokyo (JP); CITIZEN ELECTRONICS CO., LTD., Yamanashi (JP)

( * ) Notice: Subject to any disclaimer, the term of this patent is extended or adjusted under 35 U.S.C. 154(b) by 235 days.

(21) Appl. No.: 13/881,724

(22) PCT Filed: Oct. 27, 2011

(86) PCT No.: PCT/JP2011/075368
§ 371 (c)(1),
(2), (4) Date: Apr. 26, 2013

(87) PCT Pub. No.: WO2012/057369
PCT Pub. Date: May 3, 2012

(65) Prior Publication Data
US 2013/0221864 A1    Aug. 29, 2013

(30) Foreign Application Priority Data

Oct. 28, 2010  (JP) ................. 2010-241943
Nov. 26, 2010  (JP) ................. 2010-263492
Dec. 2, 2010   (JP) ................. 2010-269223

(51) Int. Cl.
*H05B 37/02* (2006.01)
*H05B 33/08* (2006.01)
(Continued)

(52) U.S. Cl.
CPC ............ *H05B 37/02* (2013.01); *H05B 33/0809* (2013.01); *F21K 9/1375* (2013.01); *F21Y 2101/02* (2013.01); *H05B 33/08* (2013.01);
(Continued)

(58) Field of Classification Search
None
See application file for complete search history.

(56) References Cited

U.S. PATENT DOCUMENTS

| 5,373,215 A * | 12/1994 | Steinkraus, Jr. ........... 315/200 R |
| 6,577,072 B2 * | 6/2003 | Saito et al. ................ 315/185 R |
| 8,237,373 B2 * | 8/2012 | Fukui .......................... 315/291 |

(Continued)

FOREIGN PATENT DOCUMENTS

| JP | H02-066890 A | 3/1990 |
| JP | 2004-335128 A | 11/2004 |

(Continued)

OTHER PUBLICATIONS

International Search Report for PCT/JP2011/075368, Dec. 6, 2011.

*Primary Examiner* — Tuan T Lam

(57) ABSTRACT

The purpose of the present invention is to provide an LED lighting circuit, which can normally light an LED even if an alternating current power supply is an electronic transformer, an LED illuminating device, and a socket for an LED illuminating unit. Disclosed is an LED lighting circuit includes a rectifier circuit for rectifying an AC output from an AC power supply, an LED drive unit, which drives the LED by having rectifying output inputted thereto from the rectifying circuit, a reverse current preventing unit, which is provided between the rectifying circuit and the LED drive unit, and a terminal voltage control unit, which reduces the output terminal voltage of the rectifying circuit in the case where the alternating current output from the alternating current power supply is unstable or stopped. Also provided are an LED illuminating device, and a socket for an LED illuminating unit.

12 Claims, 8 Drawing Sheets

(51) Int. Cl.
*F21K 99/00* (2010.01)
*F21Y 101/02* (2006.01)

(52) U.S. Cl.
CPC ......... *H05B 33/0815* (2013.01); *H05B 33/0833* (2013.01); *H05B 33/0839* (2013.01)

(56) References Cited

U.S. PATENT DOCUMENTS

| | | | |
|---|---|---|---|
| 8,487,552 B2 * | 7/2013 | Watanabe et al. | 315/307 |
| 8,581,508 B2 * | 11/2013 | Horino | 315/247 |
| 8,816,597 B2 * | 8/2014 | Suzuki | 315/291 |
| 2010/0207536 A1 * | 8/2010 | Burdalski et al. | 315/224 |
| 2011/0266965 A1 * | 11/2011 | Xu et al. | 315/200 R |
| 2011/0285301 A1 * | 11/2011 | Kuang et al. | 315/200 R |
| 2012/0098457 A1 * | 4/2012 | Radermacher | 315/291 |

FOREIGN PATENT DOCUMENTS

| | | |
|---|---|---|
| JP | 2009-302017 A | 12/2009 |
| JP | 2010-118244 A | 5/2010 |
| JP | 2010-135139 A | 6/2010 |
| JP | 2011-091942 A | 5/2011 |

* cited by examiner

PRIOR ART

LED LIGHTING CIRCUIT, LED ILLUMINATION DEVICE, AND LED ILLUMINATION UNIT SOCKET

TECHNICAL FIELD

The present invention relates to an LED lighting circuit that can properly light an LED even with a power supply obtained from an inverter circuit, and also relates to an LED illumination device and an LED illumination unit socket.

BACKGROUND

Halogen lamps that operate at a rated voltage or 12 V are in widespread use. The power supply for such halogen lamps is often produced by stepping down a line supply voltage. Since a conventional step-down transformer is bulky, a device (hereinafter referred to as an electronic transformer) is employed that converts the AC line supply voltage to a high-frequency voltage by using an inverter circuit and then converts the voltage to a lower voltage by using a high-frequency transformer. The inverter circuit to be used in the electronic transformer is one of two types, a self-excited oscillation type or an externally excited oscillation type (refer, for example, to FIG. 6 in patent document 1).

FIG. 12 is a diagram showing a lighting device equipped with a self-excited inverter as presented in the description of the prior art in patent document 1.

The lighting device comprises an AC power supply 1, a full-wave rectifier 2, a halogen lamp 14, a half-bridge inverter circuit, and other circuit elements, and the entire circuitry, excluding the AC power supply 1 and the halogen lamp 14, corresponds to the electronic transformer. A circuit comprising a resistor 5, a capacitor 6, and a triggering device 7 outputs an oscillation initiating trigger when a predetermined voltage is reached. Self-excited oscillation occurs within a circuit comprising capacitors 3 and 4, transistors 8 and 9, and a current feedback transformer 13. A high-frequency step-down, transformer 12 produces an AC drive voltage for the halogen lamp 14. Diodes 10 and 11 are protection diodes for providing protection against back electromotive force. The lighting device depicted in FIG. 12 shows the operating principle of the half-bridge inverter circuit.

The invention disclosed in patent document 1 is intended to suppress the rush current that occurs during startup, and for that purpose, a soft start circuit A and a voltage feedback circuit B are provided as shown in FIG. 1 included in patent document 1.

Recently, LED illumination devices have begun to be used widely, replacing not only incandescent lamps but also halogen lamps. Conventional halogen lamps have power ratings of 20 to 40 W but, in the case of LED illumination devices, brightness comparable to halogen lamps can be obtained at 4 W which is about one-fifths of the above power rating. However, if the self-excited electronic transformer is inserted between the AC line power supply and the halogen lamp bayonet, base (MR16 or MR11 in the case of 12-V halogen lamps), as described above, the LED illumination device may not light (or may turn on and off erratically).

Electronic transformers widely used for halogen lamps range from small ones for driving single halogen lamps to large ones rated for 100 to 300 W capable of driving several halogen lamps. For these electronic transformers, the minimum operating power necessary for startup is specified in order to produce a stable output of 12 VAC, and generally a circuit load of 10 to 30 W is required. When an LED illumination device is connected to such an electronic transformer (for example, in FIG. 12, the LED illumination device is connected to the secondary side n2 of the high-frequency step-down transformer 12), the output of the electronic transformer may become unstable due to an insufficient load, causing the LED illumination device to malfunction by failing to light or turning on and off erratically.

In view of the above, there is proposed a circuit that ensures stable operation when the LED illumination device is connected, regardless of whether the inverter circuit used for the 12-V halogen lamp power supply is of the self-excited oscillation type or the externally excited oscillation type (patent document 2).

FIG. 13 is a diagram redrawn from FIG. 2 from patent document 2.

In FIG. 13, the output of a self-excited electronic transformer (inverter-type voltage conversion circuit) (in the case of FIG. 12, the secondary side of the high-frequency step-down transformer 12) is connected to a terminal U-IN of a power feed unit 30. A lighting circuit 40 first supplies current to a startup assisting circuit 42, inducing self-excited oscillation in the electronic transformer. Next, a constant-current load circuit 43 draws a constant current from the electronic transformer to stabilize the oscillation. After that, the lighting circuit 40 causes the LED 22 to light, while at the same time, stopping the operation of the constant-current load circuit 43.

Patent document 1: Japanese unexamined Patent Publication No. H02-66890 (FIGS. 1 and 6)

Patent document 2: Japanese Unexamined Parent Publication No. 2010-135139 (FIG. 2)

SUMMARY

In the circuit shown in FIG. 13, the constant-current load circuit 43 supplements the power consumed by the LED 22 and thereby provides the power necessary for the electronic transformer to continue to operate. That is, since the power for driving the constant-current load circuit 43 becomes necessary in addition to the power necessary for driving the LED 22 itself, a large amount of power is required as a whole, thus partially defeating the purpose of the LED illumination device that features low-power operation. Furthermore, when a halogen lamp having a small external size is replaced by an LED illumination device, there arises a need to take account of not only the limitation on the heat dissipation capability of the LED illumination device itself but also the heat dissipation of the constant-current load circuit. In this case, heat generation has to be reduced by reducing the power of the LED. If the power of the LED is reduced, the brightness of the LED illumination device drops, resulting in a performance degradation. Moreover, the circuit disclosed in patent document 2 requires a larger number of components and wiring lines because of the provision of the constant-current load circuit 43, operation stopping circuit 45, and current stopping circuit 44.

It is an object of the present invention to provide an LED lighting circuit that aims to solve the above deficiencies, and an LED illumination device and an LED illumination unit socket that incorporate such an LED lighting circuit.

It is another object of the present invention to provide an LED lighting circuit that can properly light an LED even when an electronic transformer is employed for supply of AC power, and an LED illumination device and an LED illumination unit socket that incorporate such an LED lighting circuit.

It is a further object of the present invention to provide an LED lighting circuit that can properly light an LED even when an electronic transformer is employed for supply of AC power, and that can reduce the number of circuit components and minimize line power not relevant to lighting, and an LED illumination device and an LED illumination unit socket that incorporate such an LED lighting circuit.

An LED lighting circuit according to the invention includes a rectifier circuit for rectifying an AC output from an AC power supply, an LED driving unit which takes as input a rectified output from the rectifier circuit and drives an LED; a reverse current blocking unit provided between the rectifier circuit and the LED driving unit, and a terminal voltage control unit which operates to reduce an output terminal voltage of the rectifier circuit when the AC output from the AC power supply becomes unstable or stops.

Preferably, in the LED lighting circuit, the terminal voltage control unit includes at least one capacitor.

Preferably, in the LED lighting circuit, the terminal voltage control unit is a parallel circuit which includes a capacitor and a resistor.

Preferably, in the LED lighting circuit, the capacitor in the terminal voltage control unit is a tantalum capacitor or an electrolytic capacitor.

Preferably, in the LED lighting circuit, the terminal voltage control unit includes a second resistor which is connected in series with the capacitor.

Preferably, in the LED lighting circuit, the terminal voltage control unit includes a Zener diode which is connected in parallel with the capacitor.

Preferably, in the LED lighting circuit, the terminal voltage control unit includes a second capacitor which is connected in parallel with the capacitor and the second resistor.

Preferably, an the LED lighting circuit, when the output of the rectifier circuit steps, the capacitor is discharged, with a time constant that is set longer than two cycles of the AC output of the AC power supply.

Preferably, in the LED lighting circuit, the reverse current blocking unit comprises at least one diode.

An LED illumination device according to the invention is equipped with an LED lighting circuit which includes a rectifier circuit for rectifying an AC output from an AC power supply, an LED driving unit which takes as input a rectified output from the rectifier circuit and drives an LED; a reverse current blocking unit provided between the rectifier circuit and the LED driving unit, and a terminal voltage control unit which operates to reduce an output terminal voltage of the rectifier circuit when the AC output from the AC power supply becomes unstable or stops.

An LED illumination unit socket with which is connected an LED illumination unit having an LED driving unit for driving an LED includes a rectifier circuit which takes as input an AC output from an AC power supply, and which supplies a rectified output to the LED driving unit, a reverse current blocking unit provided between the rectifier circuit and the LED driving unit; and a terminal voltage control unit which operates to reduce an output terminal voltage of the rectifier circuit when the AC output from the AC power supply becomes unstable or stops.

According to the LED lighting circuit, LED illumination device, and LED illumination unit socket described above, the problem that the LED does not light or turns on and off erratically can be avoided, regardless of whether the electronic transformer for the AC power supply is of a self-excited oscillation type or an externally excited oscillation type.

The present inventor has discovered that when the electronic transformer stops due to an insufficient load, if the output terminal voltage of the rectifier circuit is reduced, the electronic transformer resumes oscillation. The present invention has been devised by utilizing this phenomenon.

Upon detecting that the output of the AC power supply has stopped (or has become unstable), the terminal voltage control unit operates to reduce the output terminal voltage of the rectifier circuit, at this time, the reverse current blocking unit acts to block the current flowing from the LED driving unit back to the output terminal side of the rectifier circuit. That is, when the voltage at the input side becomes a lower than the voltage at the output side of the reverse current blocking unit, the reverse current blocking unit electrically isolates the LED driving unit from the terminal voltage control unit; as a result, the voltage at the output terminal side of the rectifier circuit quickly drops, and thus the electronic transformer quickly resumes oscillation. In this way, the LED lighting circuit, the LED illumination device, and the apparatus constructed by connecting the LED illumination unit with the LED illumination unit socket are allowed to continue to operate in a stable manner. Furthermore, according to the LED lighting circuit, LED illumination device, and LED illumination unit socket of the invention, the provision of the terminal voltage control unit in conjunction with the revere current blocking unit serves to reduce the number of circuit components and minimize the power not relevant to lighting.

DESCRIPTION OF EMBODIMENTS

Figure 1:
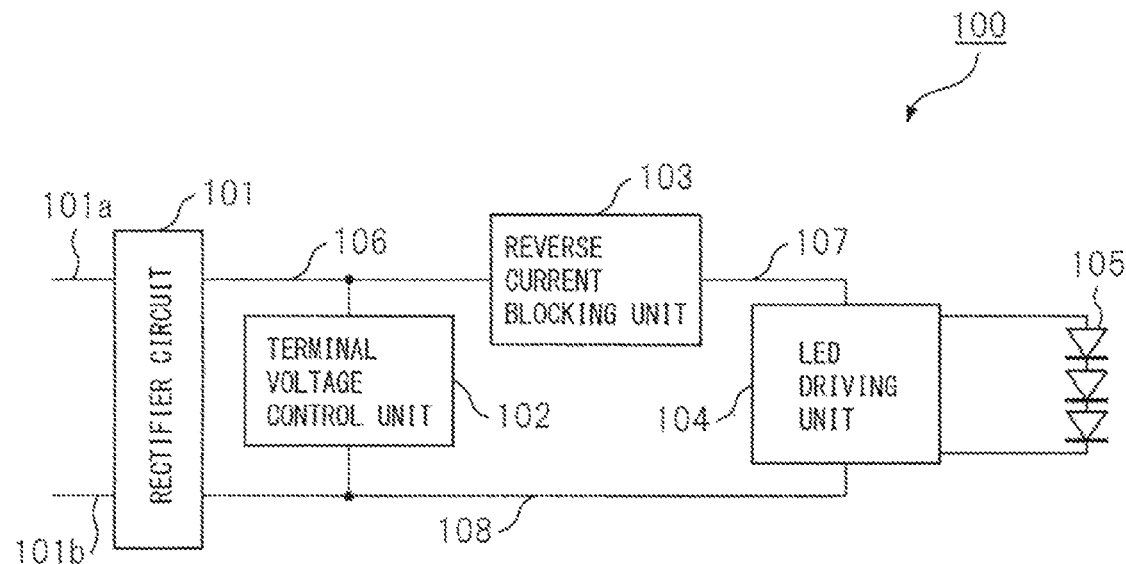
FIG. 1 is a schematic block diagram showing the configuration of an LED lighting circuit 100.

An LED Lighting circuit, an LED illumination device, and an LED illumination unit socket will be described below with reference to the drawings. It will, however, be noted that the technical scope of the present invention is not limited to any specific embodiment described herein, but extends to the inventions described in the appended claims and their equivalents. Further, throughout the drawings, the same or corresponding component elements are designated by the same reference numerals, and the description of such component elements, once given, will not be repeated thereafter.

FIG. 1 is a schematic block diagram showing the configuration of an LED lighting circuit 100.

The LED lighting circuit 100 comprises a rectifier circuit 101, a terminal voltage control unit 102, a reverse current blocking unit 103, and an LED driving unit 104. In FIG. 1, three LEDs 105 are shown as being connected to the LED lighting circuit 100. The rectifier circuit 101 has terminals 101a and 101b at which power is supplied from an AC power supply, and thus the output of the AC power supply is supplied as input to the rectifier circuit 101. The output of the rectifier circuit 101 is coupled via a wiring line 106 to both the terminal voltage control unit 102 end the reverse current blocking unit 103. The output of the reverse current blocking unit 103 is coupled via a wiring line 107 to the LED driving unit 104. The LED driving unit 104 drives the three LEDs 105 connected an series. Current from the terminal voltage control unit 102 and the LED driving unit 104 is returned to the rectifier circuit 101 via a wiring line 108.

When the output of the AC power supply becomes unstable or stops, the terminal voltage control unit 102 operates to reduce the output terminal voltage of the rectifier circuit 101 (the voltage on the wiring line 106). When the output terminal voltage of the rectifier circuit 101 becomes lower than the output terminal voltage of the reverse current blocking unit 103, the reverse current blocking unit 103 acts to block the current flowing from the LED driving unit 104 back to the output terminal side of the rectifier circuit 101.

Figure 2:
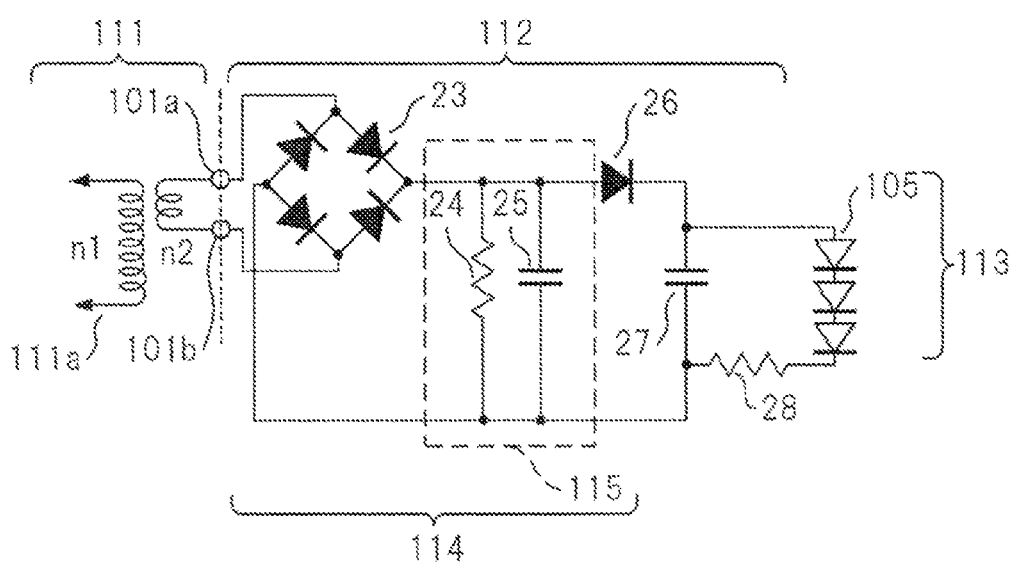
FIG. 2 is a detailed circuit diagram showing a circuit incorporating the LED lighting circuit 100 of FIG. 1.

FIG. 2 is a detailed circuit diagram showing a circuit incorporating the LED lighting circuit 100 of FIG. 1.

The secondary side n2 of a high-frequency step-down transformer 111a in the AC power supply 111 is connected to the terminals 101a and 101b. The primary side n1 is inserted in a path through which flows a high-frequency alternating current output from an inverter circuit contained in the AC power supply 111.

Next, a description will be given of how FIG. 2 corresponds to FIG. 1.

The LED lighting circuit 100 in FIG. 1 corresponds to the portion 112 shown in FIG. 2. The rectifier circuit 101 in FIG. 1 is constructed from a diode bridge circuit comprising four diodes 23. The terminal voltage control unit 102 in FIG. 1 is constructed from a parallel circuit 115 comprising a resistor 24 and a capacitor 25. The reverse current blocking unit 103 in FIG. 1 is constructed from a diode 26. The LED driving unit 104 in FIG. 1 is constructed from a combination of a capacitor 27 and a resistor 28.

The LED lighting circuit 100 includes the terminals 101a and 101b, and the secondary side n2 of the high-frequency step-down transformer 11a is connected to the diode bridge circuit via the terminals 101a and 101b. The current output terminal of the diode bridge circuit is connected to the positive terminal of the resistor 24, the positive terminal of the capacitor 25, and the anode of the diode 26. The cathode of the diode 26 and the positive terminal of the capacitor 27 are together connected to the positive terminal of the LED array 113 constructed from the three LEDs 105 connected in series. The negative terminal of the LED array 113 is connected to the current limiting resistor 28. The negative terminals of the resistor 24, capacitors 25 and 27, and resistor 28, respectively, are connected to a wiring line through which current is returned via the diode bridge circuit to the AC power supply 111 (the secondary side n2 of the high-frequency step-down transformer 111a.)

When the output of the AC power supply becomes unstable or stops, the parallel circuit 115 of the resistor 24 and capacitor 25, which, corresponds to the terminal voltage control unit 102, releases the charge stored on the capacitor 25 and thereby reduces the output terminal voltage of the rectifier circuit 101 (the voltage on the wiring line 106). At this time, the diode 26, which corresponds to the reverse current blocking unit 103, acts to block the current flowing from the LED driving unit 104, i.e., the positive terminal of the capacitor 27, back to the output terminal side of the rectifier circuit 101. The capacitor 27 in the LED driving unit 104 is a smoothing capacitor for smoothing the current to be supplied to the LED array 113, while the resistor 28 is a current limiting resistor for limiting the current flowing to the LED array 113. That the output of the AC power supply becomes unstable means that the oscillation of the inverter in the AC power supply becomes weaker and the amplitude of the AC power supply output decreases (for example, to 50% or less of the normal amplitude level) or that such a situation is beginning to occur.

The rectifier circuit 101 is net limited to the diode bridge configuration, font may be constructed from a single diode.

The terminal voltage control unit 102 may be constructed from a circuit comprising a switching device such as an FET or a bipolar transistor, since it is only required to reduce the output terminal voltage of the rectifier circuit 101. In that case, the oscillating state of the AC power supply 111 is monitored, and the switching device is turned on based on the monitoring information. For example, when the output of the AC power supply is unstable or stops, the terminal voltage control unit 102 operates to reduce the output terminal voltage of the rectifier circuit 101 to about 5 to 7 V. This helps to restore the oscillation of the inverter in the AC power supply 111.

The reverse current blocking unit 103 is not limited to a diode, but instead, use may be made of a switching device. In that case, the oscillating state of the AC power supply 111 or the result of a comparison made between the magnitude of the drive voltage of the LED driving unit 104 and the magnitude of the output terminal voltage of the rectifier circuit 101 is monitored to control the on/off operation of the switching device.

The LED driving unit 104 may be constructed using a known voltage step-up circuit, voltage step-down circuit, or constant-current circuit. The resistor 28 may be replaced by a known constant-current circuit. If stray capacitance can be used, the capacitor 25 may be omitted.

In the circuit depicted in FIG. 2, the value of the resistor 24 is 160Ω, the value of the capacitor 25 is 10 µF, and the value of the capacitor 27 is 220 µF, though these values may vary depending on the rating of the electronic transformer and the current consumption of the LED array. The time constant of the parallel circuit of the resistor 24 and capacitor 25 is 1.6 ms; since the oscillation frequency of the inverter is about 30 kHz to 80 kHz, it follows that the time constant is several to several tens of times as long as the oscillation period. If the time constant is at least about twice the oscillation period, erroneous oscillation of the inverter contained in the electronic transformer can be prevented. Further, since the power supply is a 12-V power supply, three LEDs 105, each with a forward voltage of about 3 V, are connected in series.

FIG. 3 is a diagram showing voltage waveforms taken at various parts in the circuit of FIG. 2.

Figure 3A:
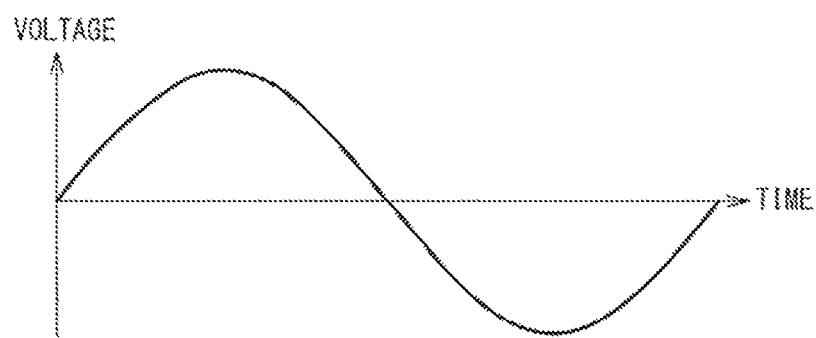
FIGS. 3(a) to 3(e) are diagrams showing voltage waveforms taken at various parts in the circuit of FIG. 2.

FIG. 3(a) shows one cycle of the AC waveform of the AC line power supply in order to provide a general idea of the time relationship.

Figure 3B:
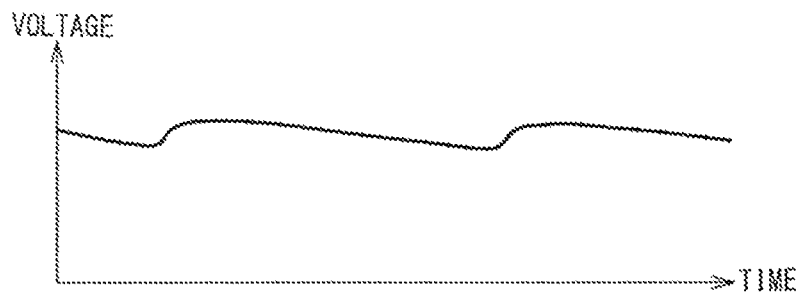

FIG. 3(b) shows the voltage waveform taken at the cathode of the diode 26. That is, FIG. 3(b) shows the drive voltage of the LED driving unit 104, which is also the voltage applied to the positive side of the LED array 3. This voltage waveform rises with a short delay relative to the rising of the AC line power supply, has a peak near the peak of the AC line power supply, and thereafter gradually falls. When the voltage (in absolute value) of the AC line power supply rises above a certain level, the oscillation of the inverter circuit contained in the electronic transformer continues to persist, as will be described later, and extra power is available to charge the capacitor 27, as a result of which the voltage waveform shown in FIG. 3(b) rises.

During the period that the inverter circuit is oscillating, current flows to the LED array 113 via the diode 26. As the AC line supply voltage of FIG. 3(a) rises, and the oscillation period increases, extra charge is stored on the capacitor 27. As a result, the voltage waveform of FIG. 3(b) rises with a delay relative to the AC line power supply.

Figure 3C:
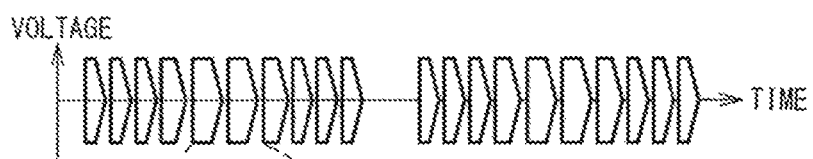

FIG. 3(c) shows a voltage waveform applied to the terminal 101a. Each pentagonal portion corresponds to the period during which the oscillation output is produced. In each pentagonal portion, the period defined by the parallel top and bottom sides represents the full oscillation period, and the period defined by the sloping sides represents the decay period. That is, in the lighting circuit shown in FIG. 2, the oscillation of the electronic transformer rises rapidly, and decays after a certain period of oscillation. FIG. 3(c) also shows that the oscillation period is short when the AC line supply voltage is low, and long when the AC line supply voltage is high. FIG. 3(c) further shows that when the AC line supply voltage exceeds a given value (in absolute value), the inverter circuit begins to oscillate, and also that the oscillation is intermittent.

Figure 3D:
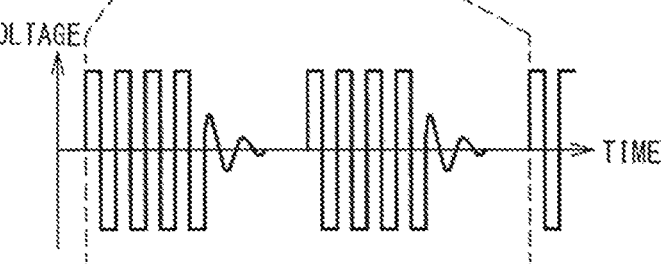

FIG. 3(d) shows, in enlarged form, the periods corresponding to two pentagonal portions in FIG. 3(c). One oscillation period corresponding to one pentagonal portion in FIG. 3(c) is shown as containing AC pulses for four cycles, but actually, it contains ten to several tens of AC pulses. The AC pulses are distorted and generally appear as a square wave. The frequency is about 30 to 80 kHz, as earlier noted. In the figure, the oscillation is shown as decaying in two cycles, but it decays relatively quickly in a few cycles. That is, the oscillation of the inverter circuit continues for a certain period, and then decays and stops. When the terminal voltage control unit 102 reduces the output voltage of the diode bridge circuit by detecting the above situation, the inverter circuit resumes oscillation. This operation is repeated.

Figure 3E:
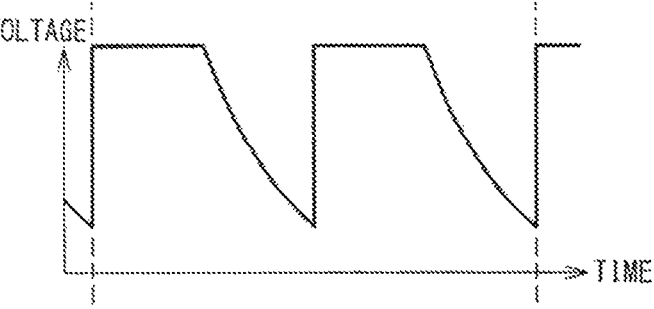

FIG. 3(e) shows the voltage waveform taken at the output terminal of the diode bridge circuit. The voltage rises to its maximum value almost simultaneously with the start of the oscillation, and the maximum voltage is maintained during the oscillation period; then, when the oscillation ends, the voltage decays. Actually, some ripple occurs daring the oscillation period, but such ripple is not shown here. When the output terminal voltage drops to a few volts, the inverter circuit resumes oscillation, and the above operation is repeated. When the waveform is closely observed, it is seen that the oscillation resumes when the output terminal voltage drops to a given fraction of the maximum voltage maintained during the oscillation period.

Figure 4:
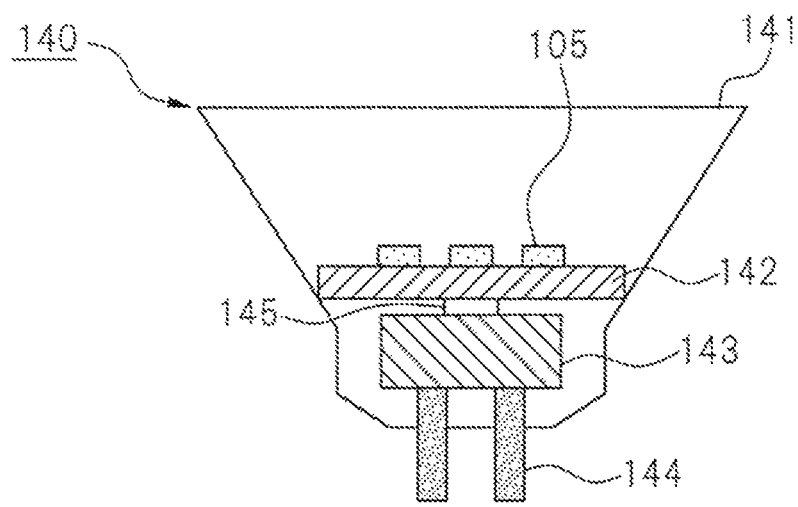
FIG. 4 is a cross-sectional view schematically illustrating a cross section of an LED illumination device 140.

FIG. 4 is a cross-sectional view schematically illustrating a cross section of an LED illumination device 140.

Two pins 144 protruding from the bottom of the outer casing 141 of the LED illumination device 140 correspond to the terminals 101a and 101b in FIG. 2 and are connected to a lighting circuit block 143. The LED lighting circuit 112 shown in FIG. 2 is contained in the lighting circuit block 143. Three LEDs 105 are mounted on a substrate 142 disposed above the lighting circuit block 143. The lighting circuit 143 is connected to the substrate 142 via interconnecting lines 145. The sloping face in the upper part of the outer casing 141 is formed in the shape of a reflecting mirror. The LED illumination device 140 shown here is compatible with a pin socket. (MR16 bayonet base), but the first and second terminals 101a and 101b may be designed so as to be compatible with a screw-in socket.

Figure 5A:
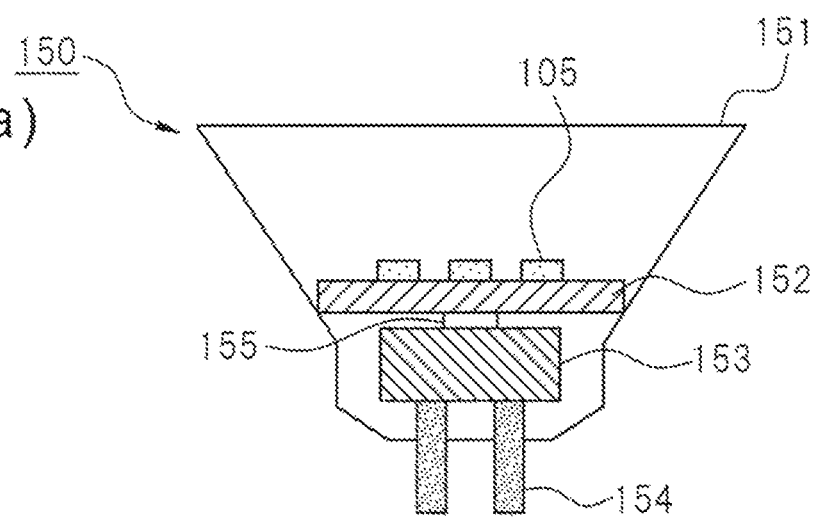
FIG. 5(a) is a cross-sectional view schematically illustrating an LED illumination unit 150.
Figure 5B:
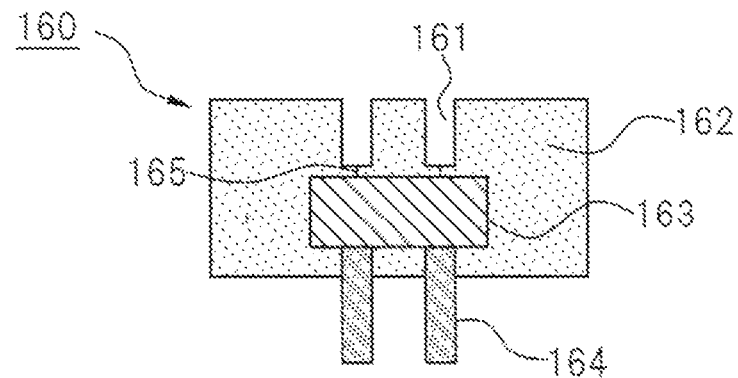
FIG. 5(b) is a cross-sectional view schematically illustrating an LED illumination unit socket 160.

FIG. 5 is a diagram showing a construction in which an LED illumination unit 150 and an LED illumination unit socket 160 are separated from each other. FIG. 5(a) is a cross-sectional view schematically illustrating the LED illumination unit 150, and FIG. 5(b) is a cross-sectional view schematically illustrating the LED illumination unit socket 160.

The difference between the LED illumination device 140 shown in FIG. 4 and the LED illumination unit 150 to be fitted into the LED illumination unit socket 160 shown in FIG. 5 is that the lighting circuit block 143 of the LED illumination device 140 is replaced by an LED driving unit 153 in the LED illumination unit 150. The LED driving unit 153 corresponds to the LED driving unit 104 in FIG. 1, and may be constructed from a smoothing circuit or a constant-current circuit or the like. A substrate 152 on which three LEDs 105 are mounted is connected via interconnecting lines 155 to the LED driving unit 153 to which pins 154 are also connected. Since the LED illumination unit socket 160 outputs DC, as will be described later, the pins 154 connected to the LED driving unit 153 have polarities.

Recesses 161 to accommodate the pins 154 for electrical connections are formed in the upper part of a mold 162 of the LED illumination unit socket 160 shown in FIG. 5(b). The electrodes of the recesses 161 are connected to a lighting circuit block 163 via interconnecting lines 165. The rectifier circuit 101, terminal voltage control circuit 102, and reverse current blocking circuit 103 shown in FIG. 1 are contained in the lighting circuit block 163. The lighting circuit block 163 corresponds to a portion shown as an LED illumination device socket circuit 114 in FIG. 2. Accordingly, when the LED illumination unit 150 is connected to the LED illumination unit socket 160, the configuration is the same as that shown in FIG. 1 and thus the entire circuit operates properly when connected to an electronic transformer.

Figure 6:
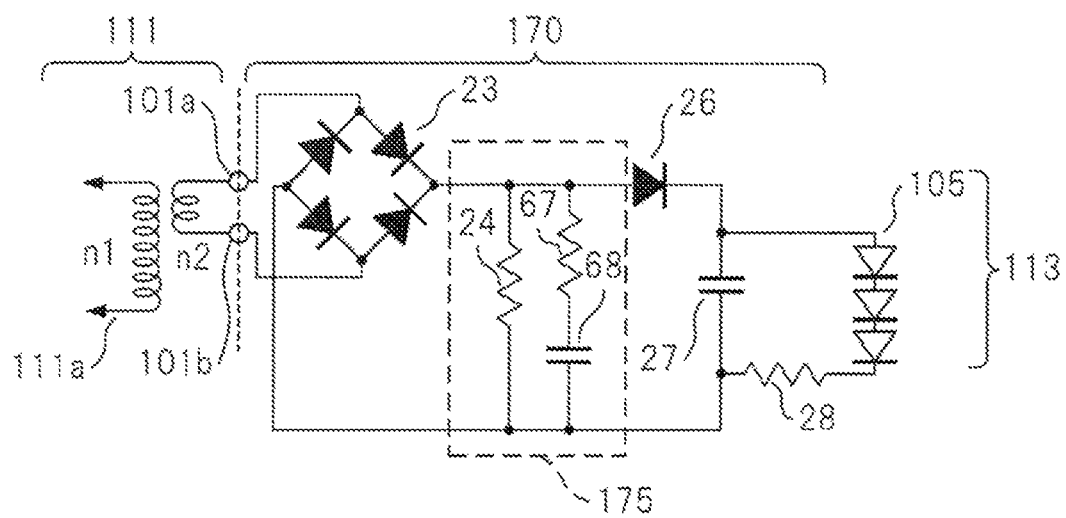
FIG. 6 is a detailed circuit diagram showing a circuit incorporating an alternative LED sighting circuit 170.

FIG. 6 is a detailed circuit diagram showing a circuit incorporating at alternative LED lighting circuit 170.

In FIG. 6, the same electronic components as those in FIG. 2 are designated by the same reference numerals, and the description of such components will not be repeated here. The difference between the circuit of FIG. 2 and the circuit of FIG. 6 is that the parallel circuit 175 that functions as the terminal voltage control unit in the LED lighting circuit 170 in FIG. 6 further includes a resistor (second resistor) 67 in series with a capacitor 68. Otherwise, the circuit of FIG. 6 is identical to the circuit of FIG. 2.

In the circuit shown in FIG. 2, if a ceramic capacitor is used as the capacitor 25, the capacitor 25 may oscillate and generate noise through the mounting substrate. It is believed that the noise is associated with the intermittent operation of the electronic transformer.

By connecting the resistor 67 in series of the capacitor 68 as shown in the LED lighting circuit 170, it becomes possible to reduce the noise that may be generated when the capacitor 68 is formed from a ceramic capacitor. It is believed that the resistor 67 serves to smooth changes in the voltage developed across the terminals of the capacitor 68 and thus contributes to reducing the noise. However, the resistance value of the resistor 67 must be held to a minimum necessary value in order to not interfere with the induced oscillation of the electronic transformer.

If a tantalum capacitor or electrolytic capacitor, not a ceramic capacitor, is used as the capacitor 68, the noise from the capacitor 68 can be further reduced. This is presumably because the electrode structure of a tantalum capacitor or electrolytic capacitor is not a rigid structure such as that of a ceramic capacitor and the noise (chatter) is suppressed due to the damping of an electrolyte contained in the tantalum capacitor or electrolytic capacitor. That is, by not only inserting the resistor 67 but also using a tantalum capacitor or electrolytic capacitor as the capacitor 68, the effect of suppressing the noise can be further enhanced.

The circuit shown in FIG. 6 can be incorporated in the LED illumination device shown in FIG. 4. The circuit shown in FIG. 6 can also be incorporated in the illumination device/sectors combination shown in FIG. 5.

Figure 7:
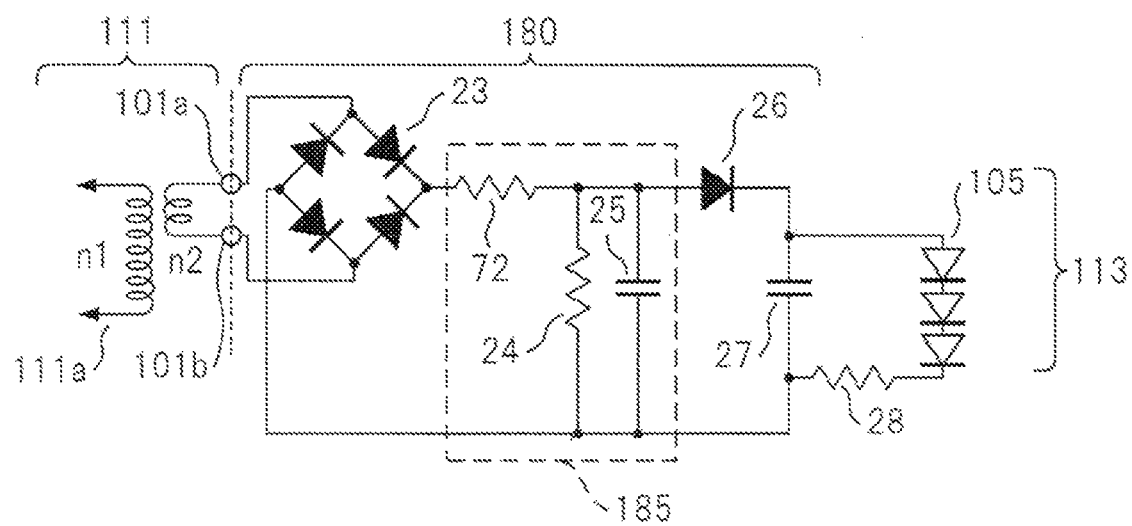
FIG. 7 is a detailed circuit diagram, showing a circuit incorporating another alternative LED lighting circuit 180.

FIG. 7 is a detailed circuit diagram showing a circuit incorporating another alternative LED lighting circuit 180.

In FIG. 7, the same electronic components as those in FIG. 2 are designated by the same reference numerals, and the description of such components will not be repeated here. The difference between the circuit of FIG. 2 and the circuit or FIG. 7 is that the circuit 185 that functions as the terminal voltage control unit in the circuit of FIG. 7 further includes a resistor (second resistor) 72 which is inserted at the output terminal of the rectifier circuit. Otherwise, the circuit of FIG. 7 is identical to the circuit of FIG. 2.

The resistor 72 is connected in series with the resistor 24, the capacitor 25, and the diode 26 (series-parallel connection). By inserting the resistor 72, the noise from the capacitor 25 can be reduced when a ceramic capacitor is used as the capacitor 25.

It is believed that the resistor 72 serves to smooth changes in the voltage developed across the terminals of the capacitor 25 and thus contributes to reducing the noise. Further, the resistor 72 can be made smaller in value than the resistor 24, and if a fusible resistor is used as the resistor 72, the circuit safety can be further increased. By not only inserting the resistor 72 but also using a tantalum capacitor or electrolytic capacitor as the capacitor 25, the effect of suppressing the noise can be further enhanced.

The circuit shows in FIG. 7 can be incorporated in the LED illumination device shown in FIG. 4. The circuit shown in FIG. 7 can also be incorporated in the illumination device/socket combination shown in FIG. 5.

Figure 8:
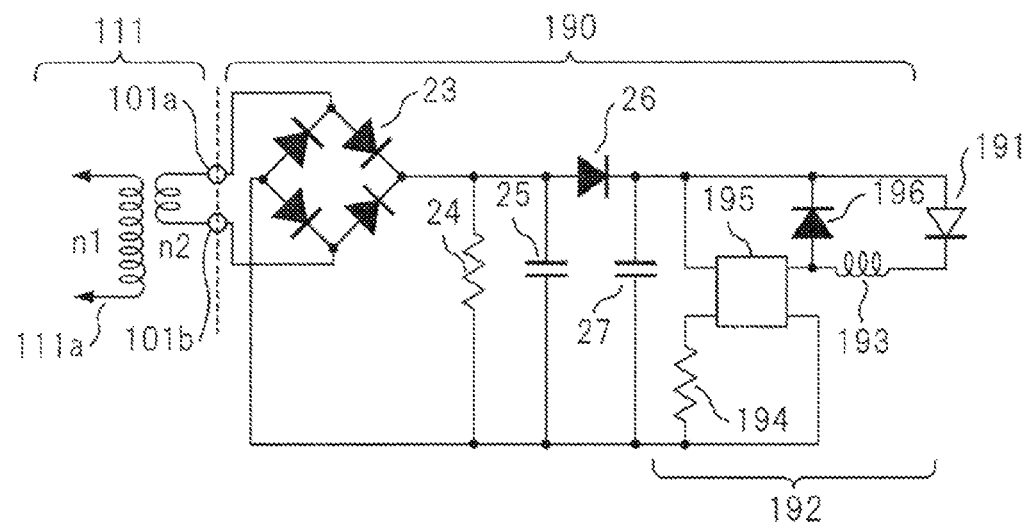
FIG. 8 is a detailed circuit diagram showing a circuit incorporating still another alternative LED lighting circuit 190.

FIG. 8 is a detailed circuit diagram showing a circuit incorporating still another alternative LED lighting circuit 190.

In FIG. 8, the same electronic components as those in FIG. 2 are designated by the same reference numerals, and the description of such components will not be repeated here. The difference between the circuit of FIG. 2 and the circuit of FIG. 8 is that the LED driving unit 104a (the suffix "a" is appended to distinguish it from the LED driving unit 104 shown in FIG. 1) includes a back converter (DC converter) 192. That is, the LED driving unit 104a is constructed from a combination of the smoothing capacitor 27 and the back converter 192. The back converter 192 is a step-down voltage converter, and converts the voltage developed across the terminals of the capacitor 27 into a lower voltage which is applied to an LED 191. The back converter 192 comprises a resistor 194, a coil 193, an IC 195, and a diode 196.

The resistor 194 is provided to detect current flowing to the LED 191, and has a resistance value not larger than 1Ω. The coil 193, working in conjunction with a switch circuit incorporated in the IC 195, maintains the current flowing to the LED 191 at a constant value. The diode 196 acts to return to the capacitor 27 the current that the coil 193 tries to continue to flow when the switch circuit is turned off. The IC 195, which takes power from the voltage developed across the terminals of the capacitor 27, includes an oscillation circuit and performs control so that desired current flows to the LED 191.

In the LED lighting circuit 112 shown in FIG. 2, the LED driving unit (see FIG. 1) is a simple one constructed from a combination of the capacitor 25 and the resistor 26. In this case, the voltage across the terminals of the capacitor 27 has to be maintained at about 9 V or higher in order for the LED array 113 to continue to operate. That is, as far as the voltage across the terminals of the capacitor 27 is concerned, the lighting circuit 112 including the LED array 113 cannot be said to have a wide operating range. Further, when the voltage across the terminals of the capacitor 27 is high (for example, 12 V), power loss due to the resistor 28 increases. Furthermore, when the voltage across the terminals of the capacitor 27 changes, the brightness of the LEDs 105 also changes.

By contrast, in the case of the LED driving unit 104a equipped with the back converter 192 as shown in FIG. 8, the circuit operates properly as long as the voltage across the terminals of the capacitor 27 is maintained at 6V or higher, for example, though it may depend on the specification of the IC 195. In this way, by using the back converter 192, the operating range associated with the voltage across the terminals of the capacitor 27 can be increased.

Further, the IC 195 performs switching to control the current flowing from the LED 191 to the coil 193 and, when the current flowing to the LED 191 increases, shuts off the current flowing from the coil 193 within the IC 195. In this case, the energy stored across the coil 193 as returned via the diode 196 to the capacitor 27. During this time, the LED 191 operates at a constant current. The LED driving unit 104a of FIG. 8 is thus free from the energy loss that occurs due to the heating of the resistor 28 in FIG. 2. Furthermore, the amount of light emission from the LED 191 is maintained constant even when the voltage across the terminals of the capacitor 27 changes to a certain extent.

Further, since the IC 195 is used to control the lighting of the LED 191, it is easy to add a dimming function (brightness control) and a protection function against temperature and overvoltage. Examples of such ICs include ZD850 by Zywyn Corporation, AL8805 by Diodes Inc., LM3405 by National Semiconductor Corporation, and RT8453 by Richtek Technology Corporation. Back converters constructed using these ICs are provided with a current measuring resistor, a coil, and a diode, though the connections of the peripheral circuitry may differ for each IC (FIG. 8 depicts the circuitry for ZD850 in simplified form).

Further, instead of the back converter, a step-up voltage converter may be used as the DC convertor. In this case, the supply voltage range for the step-up voltage converter is wide, and the high energy efficiency for light emission and the constant-current driving of LEDs are secured. However, in the case of the step-up voltage converter, the number of LED series connection stages has to be increased.

The circuit shown in FIG. 5 can be incorporated in the LED illumination device shown in FIG. 4. The circuit shown in FIG. 8 can also be incorporated in the illumination device/socket combination shown in FIG. 5.

Figure 9:
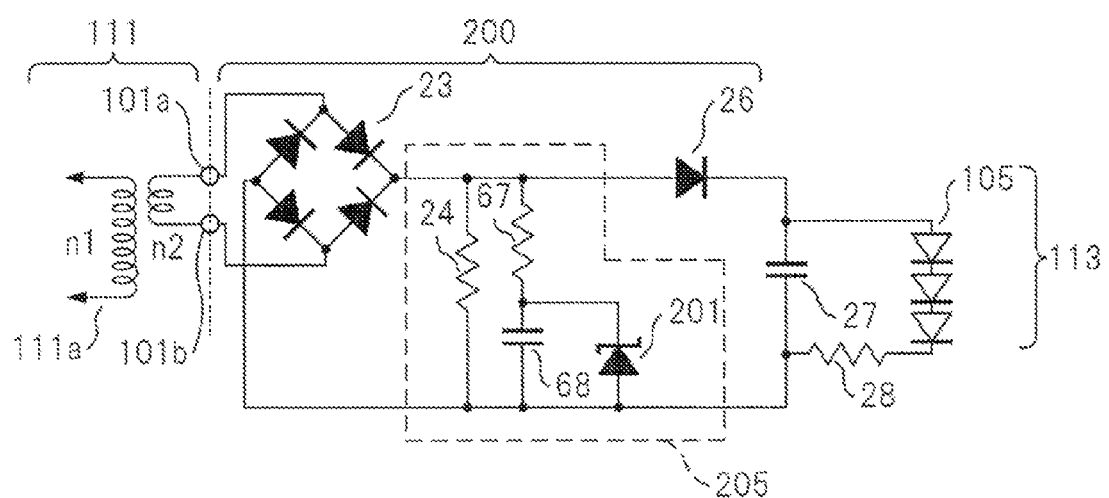
FIG. 9 is a detailed circuit diagram showing a circuit incorporating yet another alternative LED lighting circuit 200.

FIG. 9 is a detailed circuit diagram showing a circuit incorporating yet another alternative LED lighting circuit 200.

In FIG. 9, the same electronic components as those in FIG. 6 are designated by the same reference numerals, and the description of such components will not be repeated here. The only difference between the circuit of FIG. 6 and the circuit of FIG. 9 is that the circuit 205 that functions as the terminal voltage control unit in the circuit of FIG. 9 further includes a Zener diode 201 in parallel with the capacitor 68. Otherwise, the circuit of FIG. 9 is identical to the circuit of FIG. 6.

As earlier described, when the capacitor 68 is formed from a tantalum capacitor, the effect of suppressing the noise can be further enhanced. However, since the rated voltage of a tantalum capacitor is low, there arises the possibility that the rated voltage may momentarily be exceeded. To address this, in the LED lighting circuit 200 shown in FIG. 9, the Zener diode 201 is inserted in parallel with the capacitor 68, a tantalum capacitor, to provide protection so that a voltage greater than the rated voltage will not be applied to the capacitor 68 momentarily.

Likewise, when the capacitor 68 is formed from an electrolytic capacitor, the Zener diode 201 may be inserted if it is required to reduce the overall circuit size, requiring the use of a capacitor with a low breakdown strength; in this case also, the provision of the Zener diode 201 offers the advantage of being able to achieve the effect of enhancing the breakdown strength and noise suppression.

The circuit shown in FIG. 9 can be incorporated in the LED illumination device shown in FIG. 4. The circuit shown in FIG. 9 can also be incorporated in the illumination device/socket combination shown in FIG. 5.

Figure 10:
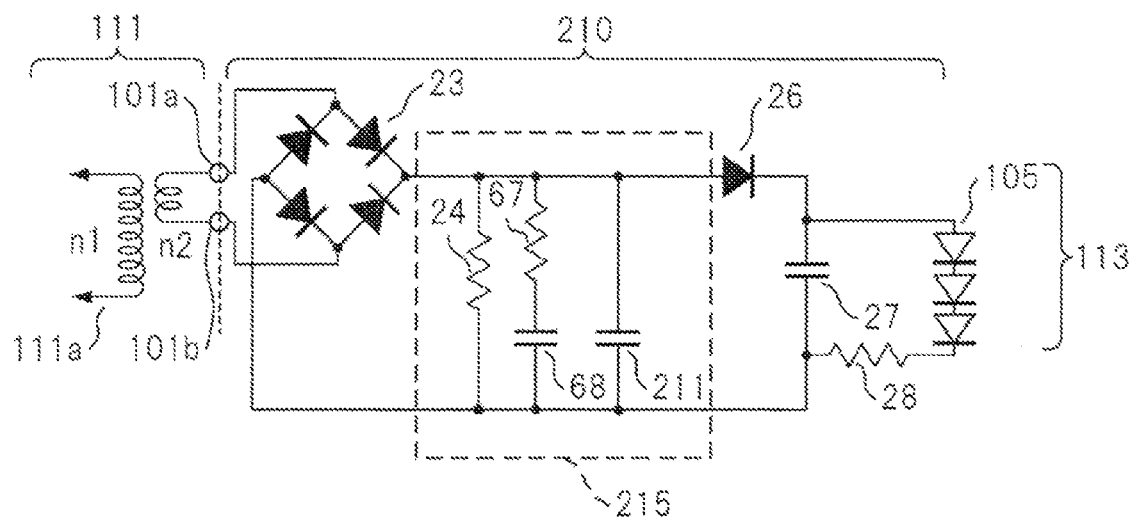
FIG. 10 is a detained circuit diagram showing a circuit incorporating a further alternative LED lighting circuit 210.

FIG. 10 is a detailed circuit diagram showing a circuit incorporating a further alternative LED lighting circuit 210.

In FIG. 10, the same electronic components as those in FIG. 6 are designated by the same reference numerals, and the description of such components will not be repeated here. The only difference between the circuit of FIG. 6 and the circuit of FIG. 10 is that the circuit 215 that functions as the terminal voltage control unit in the circuit of FIG. 10 further includes a ceramic capacitor (second capacitor) 211 which is inserted in parallel with the series connection of the capacitor 68 and the resistor 67 provided for noise suppression. Otherwise, the circuit of FIG. 10 is identical to the circuit of FIG. 6.

When the noise suppressing resistor 67 is inserted, the series resistance of the capacitor 68 and resistor 67 increases. This gives rise to the possibility that the normal operation of the parallel circuit (comprising the resistor 24 and capacitor 25 in the circuit shown in FIG. 2) may become unstable.

In view of this, the ceramic capacitor 211 is inserted in parallel with the capacitor 68 so that the parallel circuit can operate stably as intended. Here, if the capacitance of the ceramic capacitor 211 is large, the ceramic capacitor 211 itself may cause noise. It is therefore preferable that the capacitance of the ceramic capacitor 211 is held to several tens of nanofarads.

The circuit shown in FIG. 10 can be incorporated in the LED illumination device shown in FIG. 4. The circuit shown in FIG. 10 can also be incorporated in the illumination device/socket combination shown in FIG. 5.

Figure 11:
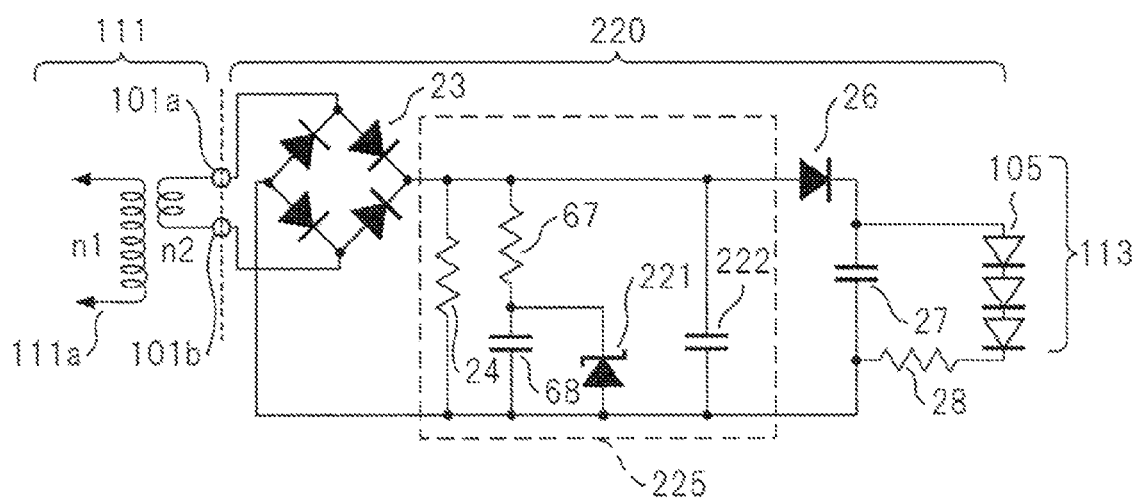
FIG. 11 is a detailed circuit diagram showing a circuit incorporating a still further alternative LED lighting circuit 220.
Figure 12:
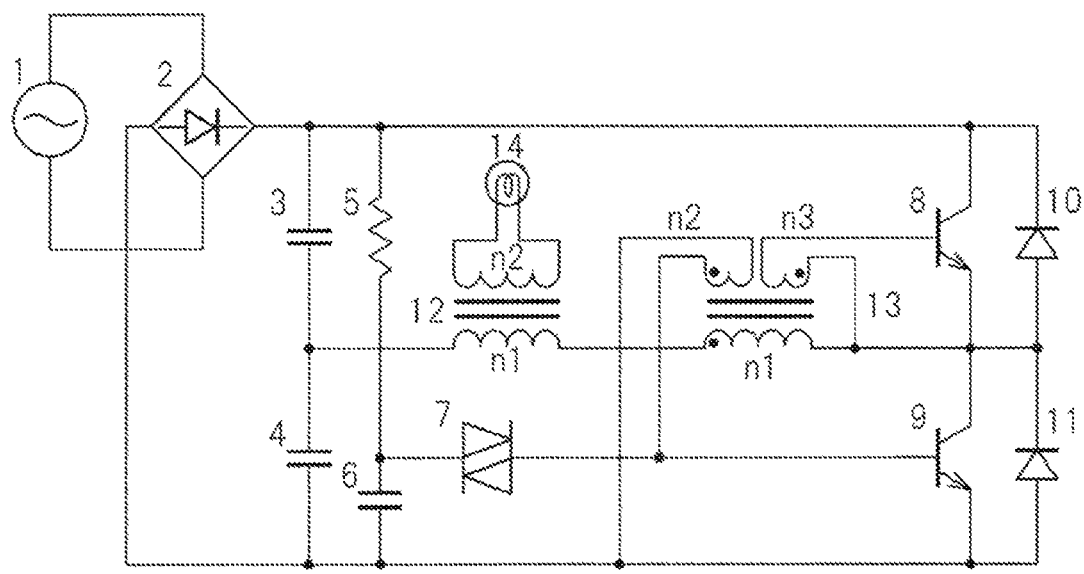
FIG. 12 is a diagram showing a lighting device equipped with a self-excited inverter as presented in the description of the prior art in patent document 1.
Figure 13:
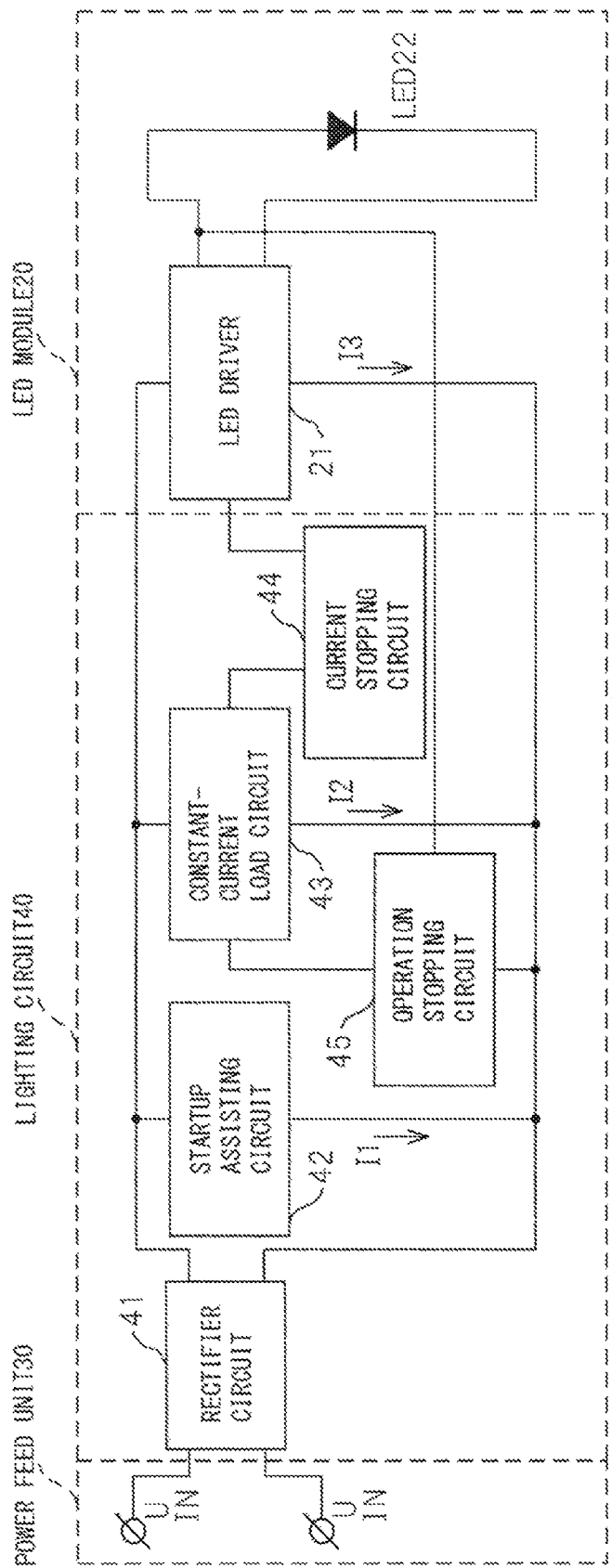
FIG. 13 is a diagram redrawn from FIG. 2 from patent document 2.

FIG. 11 is a detailed circuit diagram showing a circuit incorporating a still further alternative LED lighting circuit 220.

In FIG. 11, the same electronic components as those in FIG. 6 are designated by the same reference numerals, and the description of such components will not be repeated here. The only difference between the circuit of FIG. 6 and the circuit of FIG. 11 is that the circuit 225 that functions as the terminal voltage control unit in the circuit of FIG. 11 further includes a Zener diode 221 in parallel with the capacitor 68 and a ceramic capacitor (second capacitor) 222 in parallel with the series connection of the resistor 67 and capacitor 68. Otherwise, the circuit of FIG. 11 is identical to the circuit of FIG. 6.

The reason that the Zener diode 221 is inserted in parallel with the capacitor 68, a tantalum capacitor, is to provide protection so that a voltage greater than the rated voltage will not be applied to the capacitor 68 momentarily, as earlier described with reference to the circuit of FIG. 9.

The reason that the ceramic capacitor 222 is inserted in parallel with the series connection of the resistor 67 end capacitor 68 is to ensure that the parallel circuit will operate stably as intended, as earlier described with reference to the circuit of FIG. 10. It is preferable that the capacitance of the ceramic capacitor 222 is held to several tens of nanofarads.

The circuit shown in FIG. 11 can be incorporated in the LED illumination device a shown in FIG. 4. The circuit sheen in FIG. 11 can also be incorporated in the illumination device/socket combination shown in FIG. 5.

What is claimed is:

1. An LED lighting circuit for lighting an LED, comprising:
    a rectifier circuit for rectifying an AC output from an electronic transformer having an inverter for halogen lamps;
    an LED driving unit which takes as input a rectified output from said rectifier circuit and drives said LED;
    a reverse current blocking unit provided between said rectifier circuit and said LED driving unit; and
    a terminal voltage control unit which operates to reduce an output terminal voltage of said rectifier circuit when the AC output from the electronic transformer becomes unstable or stops, wherein
    the terminal voltage control unit consists only of passive devices.

2. The LED lighting circuit according to claim 1, wherein said terminal voltage control unit includes at least one capacitor.

3. The LED lighting circuit according to claim 2, wherein said terminal voltage control unit is a parallel circuit which includes a capacitor and a resistor.

4. The LED lighting circuit according to claim 3, wherein said capacitor in said terminal voltage control unit is a tantalum capacitor or an electrolytic capacitor.

5. The LED lighting circuit according to claim 3, wherein said terminal voltage control unit includes a second resistor which is connected in series with said capacitor.

6. The LED lighting circuit according to claim 3, wherein said terminal voltage control unit includes a Zener diode which is connected in parallel with said capacitor.

7. The LED lighting circuit according to claim 5, wherein said terminal voltage control unit includes a second capacitor which is connected in parallel with said capacitor and said second resistor.

8. The LED lighting circuit according to claim 3, wherein when the output of said rectifier circuit stops, said capacitor is discharged with a time constant that is set longer than two cycles of said AC output of the electronic transformer.

9. The LED lighting circuit according to claim 1, wherein said reverse current blocking unit includes at least one diode.

10. An LED illumination device equipped with an LED lighting circuit as described in claim 1.

11. An LED illumination unit socket with which is connected an LED illumination unit having an LED driving unit for driving an LED, said socket comprising:
    a rectifier circuit for rectifying an AC output from an electronic transformer having an inverter for halogen lamps, and supplying a rectified output to said LED driving unit;
    a reverse current blocking unit provided between said rectifier circuit and said LED driving unit; and
    a terminal voltage control unit which operates to reduce an output terminal voltage of said rectifier circuit when the AC output from the electronic transformer becomes unstable or stops, wherein the terminal voltage control unit consists only of passive devices.

12. An LED lighting circuit for lighting an LED, comprising:
- a rectifier circuit for rectifying an AC output from an AC power supply;
- an LED driving unit which takes as input a rectified output from said rectifier circuit and drives said LED;
- a reverse current blocking unit provided between said rectifier circuit and said LED driving unit; and
- a terminal voltage control unit which operates to reduce an output terminal voltage of said rectifier circuit when the AC output from the AC power supply becomes unstable or stops,
- wherein said terminal voltage control unit is a parallel circuit which includes a capacitor and a resistor
- wherein said terminal voltage control unit includes a second resistor which is connected in series with said capacitor, and
- wherein said terminal voltage control unit includes a second capacitor which is connected in parallel with said capacitor and said second resistor.

\* \* \* \* \*